United States Patent [19]

Lessard et al.

[11] 4,383,401

[45] May 17, 1983

[54] TWIN MOUNTED DOUBLE SIDED RECIPROCATING SHAPING MECHANISM

[75] Inventors: Kenneth R. Lessard, Albany; John M. McElrath, Jr., Macon, both of Ga.

[73] Assignee: Christmas Trees, Ltd., Macon, Ga.

[21] Appl. No.: 316,745

[22] Filed: Oct. 30, 1981

[51] Int. Cl.³ ............................................ A01D 55/02
[52] U.S. Cl. ........................................................ 56/236
[58] Field of Search ................. 56/233, 234, 235, 236, 56/237

[56] References Cited

U.S. PATENT DOCUMENTS

| 424,803 | 4/1890 | Lowell | 56/236 |
|---|---|---|---|
| 3,496,709 | 2/1970 | Egbert et al. | 56/237 |
| 3,597,908 | 8/1971 | Schaefer | 56/233 |
| 3,888,071 | 6/1975 | Wallace | 56/237 |
| 3,913,304 | 10/1975 | Jodoin | 56/235 |

FOREIGN PATENT DOCUMENTS

| 170948 | 5/1906 | Fed. Rep. of Germany | 56/233 |
|---|---|---|---|
| 1231372 | 9/1960 | France | 56/236 |
| 1356619 | 12/1964 | France | 56/236 |
| 1358519 | 12/1964 | France | 56/236 |

*Primary Examiner*—Paul J. Hirsch
*Attorney, Agent, or Firm*—Sherman Levy

[57] ABSTRACT

A twin mounted double sided reciprocating shaping mechanism is provided which is formed in the shape of an acute isosceles triangle whereby the bottom is opened to the ground and each cutting mechanism is bent or deformed along the longitudinal axis to form to a conical shape when rotated about the center axis of the isosceles triangle. The twin mounted double sided reciprocating shaping mechanism is adapted to be used for cutting and shaping and forming trees, bushes and the like in the contour of a cone. Sets of cutting and shaping elements are suspended from a frame, and wherein the cutter and shaping elements can shape trees and the like in the form of a cone.

13 Claims, 6 Drawing Figures

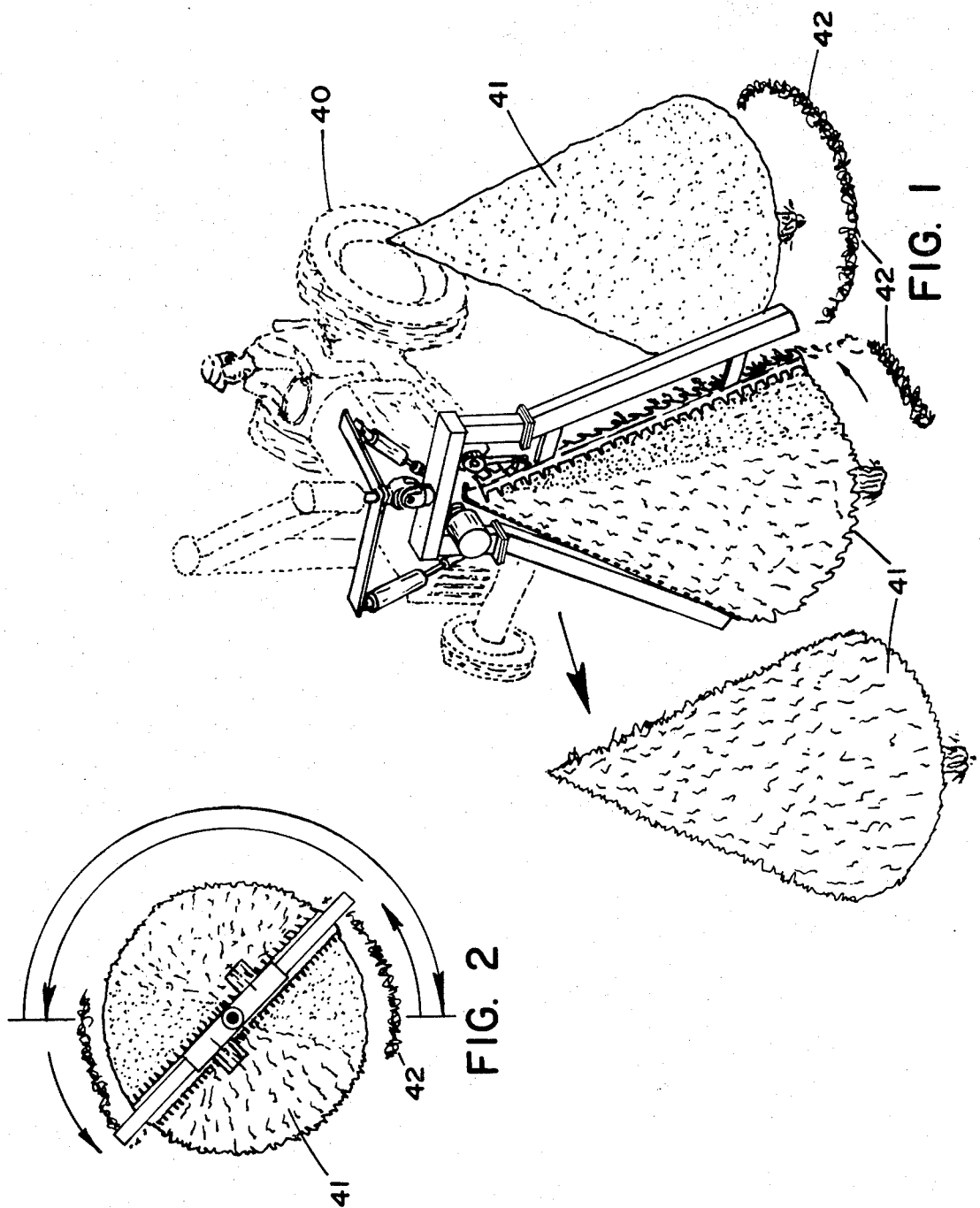

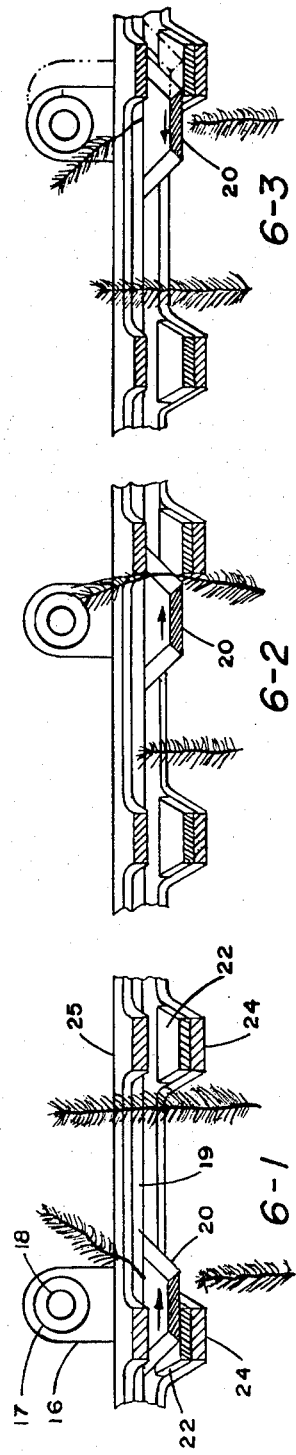
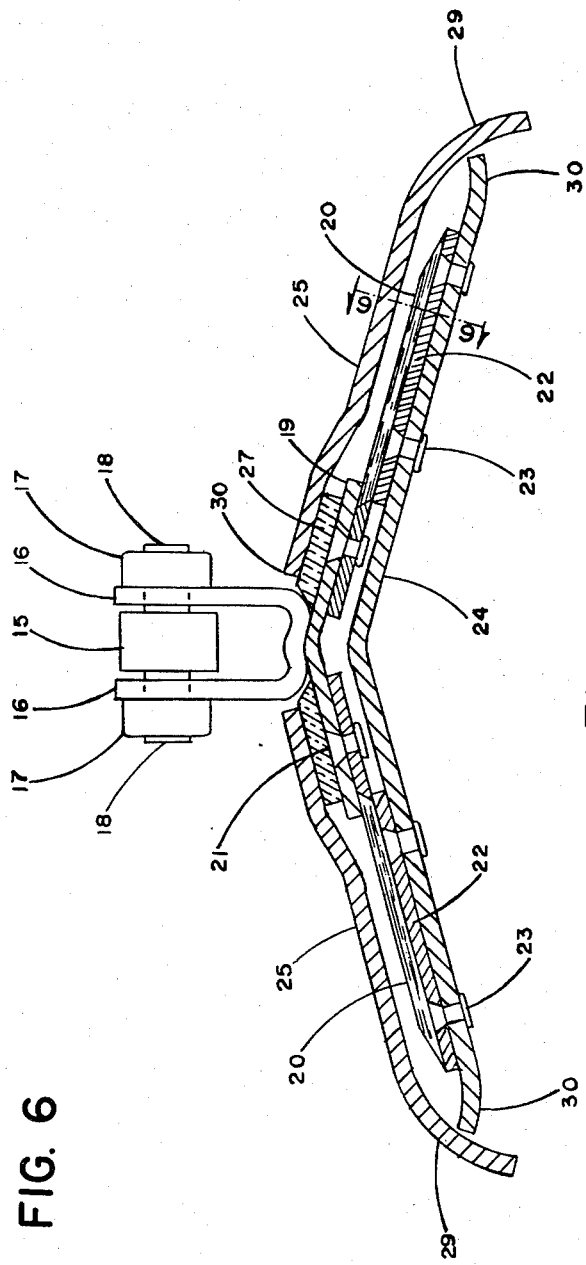
FIG. 6
FIG. 5

TWIN MOUNTED DOUBLE SIDED RECIPROCATING SHAPING MECHANISM

FIELD OF THE INVENTION

The present invention is concerned with the conical cutting and shaping of shrubs or trees such as Christmas trees but is not limited to use with Christmas trees. There is provided twin mounted double sided shaping mechanisms which are attached and assembled to a support frame in the shape of an acute isosceles triangle which can be rotated one half a revolution in either a clockwise or counter-clockwise direction about the center line axis of the triangle to shear off excess growth and form a conical shaped shrub or tree in a highly advantageous manner.

DESCRIPTION OF THE PRIOR ART

Heretofore various types of apparatus have been provided for shaping of trees and the like, and in the past, shaping of conical shaped shrubs or trees was done manually using manually operated shears or knives, or by electrically operated trimming devices, manually maneuvered around a shrub or tree. As for example attention is directed to prior U.S. Pat. Nos. 912,164; 999,135; 1,285,203; 1,489,658; 1,788,237; 1,806,116; 1,832,993; 1,919,516; 1,996,624; 2,509,564; 2,558,459; 2,564,032; and 2,630,628. However, neither of these prior patents nor any others known to applicant achieve the advantages of the present invention.

BACKGROUND AND SUMMARY OF THE INVENTION

As is known, the Christmas tree industry is growing in the South due to the shorter growing time required to produce a tree. This accelerated growth also requires frequent shaping of the trees which is not a problem in the Northern climates.

The present invention is a twin mounted double sided reciprocating shaping mechanism for shaping trees such as Christmas trees, and wherein the cutting mechanism can be suspended from a mobile vehicle of a suitable size and configuration which will supply a rotating motion by any conventional means and in turn rotate the shaping mechanism one half a revolution around a shrub or tree through a restricted swing universal joint attached between the cutting mechanism support frame and the conventionally powered rotating motion.

It is an object of the present invention to provide a twin mounted double sided reciprocating shaping mechanism which is of such a length and configuration that a tree or shrub will be completely cut and shaped to form a cone by rotating said mechanism one half a revolution.

It is a still further object of the present invention to provide a cutting and shaping mechanism which is double edged, and which when rotated in either a clockwise or counter-clockwise motion from its top will shear and cut off material in a generally conical path or configuration.

A still further object of the present invention is to provide a cutting and shaping mechanism which is mounted from a universal joint to provide an infinite degree of adjustment when the mobile vehicle is un-level, and thus, have the cutting and shaping mechanism hanging with its center line axis plum or vertical.

A still further object of the present invention is to provide a twin mounted double sided shaping mechanism wherein both the cutting edges of each cutting mechanism are bent in towards the center of an isosceles triangle to produce a combing operation when cutting. This bend is to be along the entire longitudinal center line of both cutting mechanisms. With this formation of reciprocating cutting, the twigs or branches are combed out into the cutting blades and fall to the ground and on the outside of the cutting path. Further, each of the twin cutting mechanisms are adapted to have an independent identical power source so mounted so as to achieve a balanced effect, thereby maintaining the center line of the acute isosceles triangle plum and vertical with respect to gravity.

It is a still further object of the present invention to provide a twin mounted double sided reciprocating shaping mechanism that is ruggedly constructed and relatively simple to manufacture and efficient in use.

Other objects of the invention are to provide a twin mounted double sided reciprocating cutting mechanism which is relatively inexpensive and wherein there is provided a novel and improved construction and arrangement of parts. The above and other features and objects of the invention will be apparent to those skilled in the art to which this invention pertains from the following detailed description and the drawings.

BRIEF DESCRIPTION OF THE DRAWINGS

FIG. 1 is a perspective view of the shaping mechanism, attached to a mobile vehicle, shaping trees in a row.

FIG. 2 is a plan view of the shaping mechanism showing possible rotation of one half a revolution while shaping a tree.

FIG. 5 is an enlarged cross section of the shaping blade assembly taken along line 5—5 of FIG. 3. FIG. 6 is a longitudinal enlarged cross sectional view showing the three basic reciprocating movements of the cutting knife, illustrated by 6-1, 6-2, and 6-3.

DESCRIPTION OF THE PREFERRED EMBODIMENT

Figure 4:
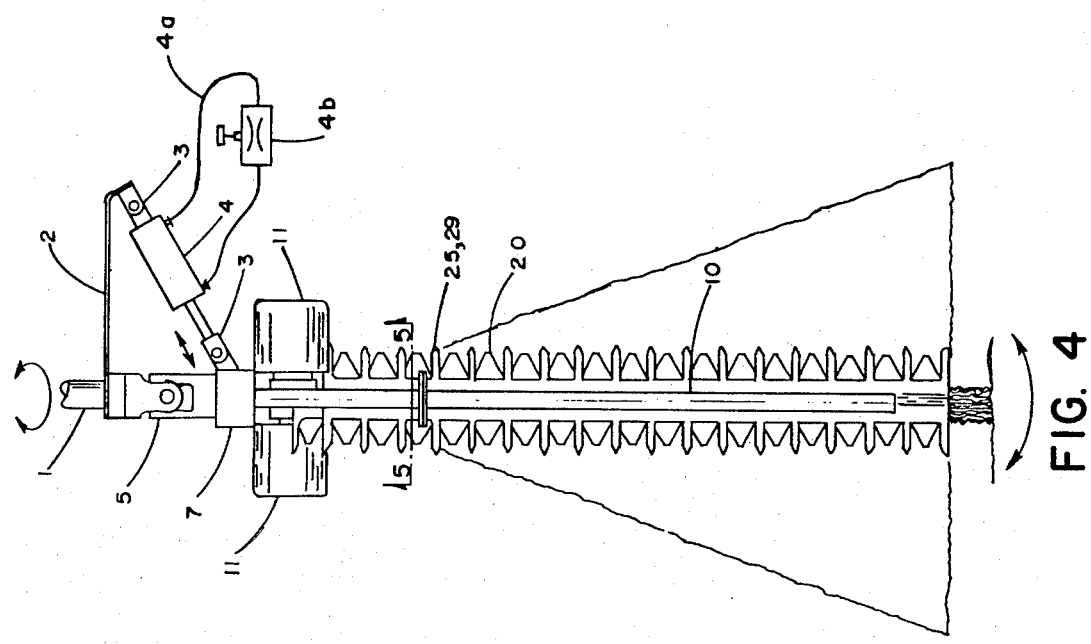
FIG. 4 is a side view of the present invention along the line 4—4 of FIG. 3.
Figure 3:
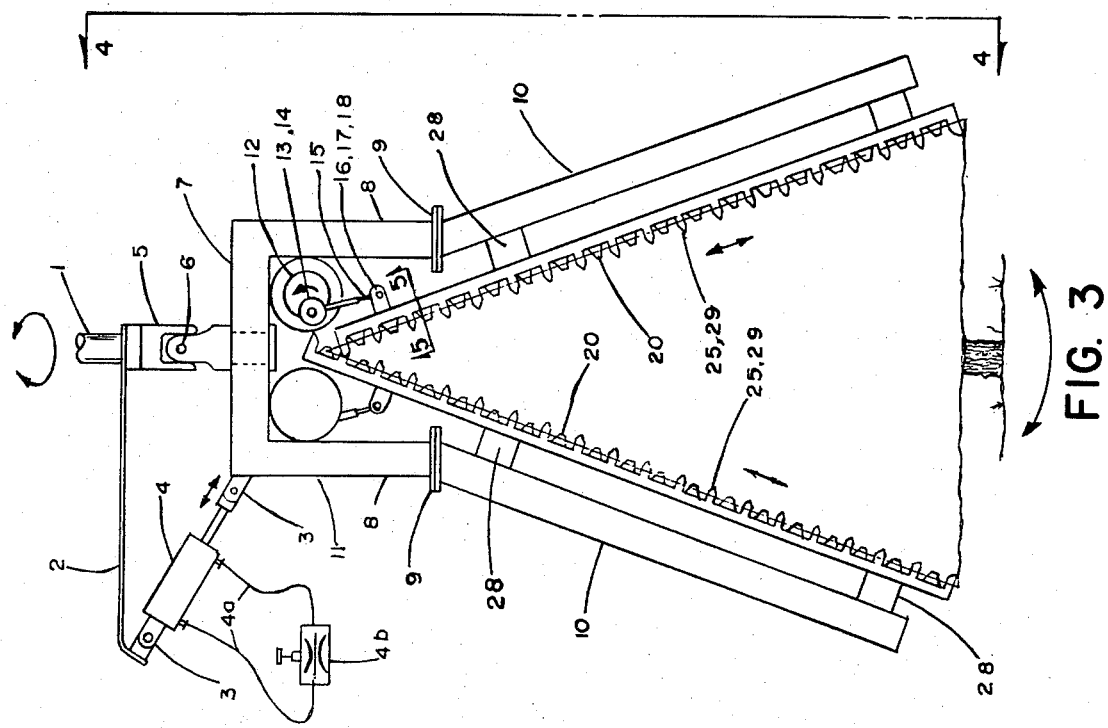
FIG. 3 is a side view of the preferred embodiment of the present invention.

Referring in detail to the drawings, the numeral 1 indicates a shaft which is supported from a mobile vehicle which is power rotated by conventional means not shown. In FIG. 1 the numeral 40 indicates a conventional vehicle such as a tractor that can be used for supporting the present invention. Also in FIG. 1, the numeral 41 indicates trees, shrubs and the like that are being trimmed in the desired fashion, and the numeral 42 indicates the trimmings that are formed, as later described in this application. Referring to FIG. 3, arms 2 are attached to the shaft 1 at the top of a universal joint 5 and are perpendicular to the shaft 1. Arms 2 are spread 90 degrees apart and support cylinders 4 by universal joints 3 located at both ends of the cylinder. It will be noted that as a frame 7 and 8 sways in an infinite direction due to the universal joint mounting, the shaft in the cylinder 4 extends and retracts and results in forcing fluid flow contained in the cylinder through lines 4a connected to flow restrictive valve 4b. When frame 7 and 8 come to rest, valve 4b is manually closed, blocking line 4a and restricting movement of the cylinder 4 which will prevent universal joint 5 from operating universally and making it a rigid form connected to the frame 7 by pin 6 as shown in the drawings. The flow restrictive valve 4b also furnishes a resistive force on the oil flow which enables the use of conventional cylinders to produce a shock absorber effect thereby reducing the time element in bringing the frame to rest.

It will be noted that the frame 8 has extension frame 10 coupled by flanges 9 and frame 10 in turn supports the finger bar 25 at points 28.

A motor 11 supplies rotating motion to the eccentric 12 attached to the motor shaft, which rotates the arm 13 in a circular motion attached by bolt 14. A connecting eye joint 15 connects arm 13 to the bracket 16 by pin 18 and collars 17 as shown in FIGS. 1, 3 and 5. The bracket 16 is attached to the knife bar 19 and guided by slot 30 and slide bearing 27 to produce a reciprocating motion when the eccentric 13 is rotated.

As shown in the drawings, the knife bar 19 is shown bent along the longitudinal axis to be tangent to an arc when rotated around a conical shaped shrub or tree. Double edged knives 20 are attached to the knife bar 19 by rivets 21 and are equally spaced down the longitudinal axis on both longitudinal edges of the knife bar 19.

FIG. 6 shows the double edged knives 20 reciprocating across inserts 22 producing a shearing action in both directions of movement. Inserts 22 are mounted equally spaced by rivets 23 to the finger shapes of backing bar 24 which has slotted fingers extending outward on both sides and joined by a center section which is bent on the longitudinal axis to conform to the angle formed by 30 knife bar 19. The double edged knives 20 reciprocate across the slots in backing bar 24 and crosses over inserts 22 to shear off any object which passes between the fingers of the backing bar 24.

Also, the backing bar 24 has equally spaced fingers 30 that are formed at the ends to meet under the finger bar 25 at points 29. This overlap of fingers 30 guides small twigs and branches back into the reciprocating shearing knives. Further, the finger bar is formed along its longitudinal axis to conform to the angle at which the knife bar 19 is bent. The fingers on the finger bar 25 guide the twigs or branches into the double edged knives 20 and support them while shearing to reduce the shearing force required and to produce a clean cut rather than a fold over and tear off action.

It will be noted that as both cutting and shaping assemblies rotate selectively clockwise or counter-clockwise, a conical shaped bush, tree, shrub, or the like 41 is formed by their cutting paths. The sheared material 42 falls to the outside of the cone. Because of the twin cutting mechanisms being used, the assembly may or need travel only one half a revolution to obtain a conical shape. This feature provides the user the option of shaping shrubs or trees in a row, FIG. 1, by revolving one half a revolution in one direction and then proceeding to the next shrub or tree to reverse the revolution and to shape it.

Further, with the ability to cut and shape in any direction and using one half a revolution by the use of the present invention, it is found that the apparatus of the invention is much faster and efficient than conventional single reciprocating cutting bars which must rotate one complete revolution to shape a tree. The double edged knives permit the present invention to cut in either direction of rotating motion while combing the twigs or branches into the knives as previously noted.

From the foregoing, it will be seen that there has been provided a twin mounted double sided reciprocating shaping mechanism which is adapted to cut and shape and form trees, bushes, shrubs and the like in the contour of a cone. There is provided sets of cutter and shaping elements which are mounted on a suitable supporting frame, and the cutting and shaping elements can be selectively positioned in conjunction with a universal joint so as to permit the cutter and shaping elements to cone shape trees and the like even when a vehicle such as the vehicle 40 supporting the structure is not level as previously noted. The twin mounted double sided reciprocating shaping mechanism is formed in the shape of an acute isosceles triangle whereby the bottom is opened to the ground and each cutting mechanism is bent or deformed along the longitudinal axis to form to a conical shape when rotated about the center axis of the isosceles triangle.

Some of the important aspects or features of the present invention are as follows. There is a universal joint suspending arrangement using two reciprocating cylinders as shock absorbers. Twin reciprocating cutting assemblies are used to reduce the rotary travel to one half a revolution. The cutting blades are bent and double sided to produce a combing effect when shaping. The trimming fall to the outside of the tree on the ground. When a rotary blade is used such as that shown in U.S. Pat. No. 3,913,304, the trimmings fly around producing a mess as well as a danger to personnel. This trimming can also spread insects and disease and must be contained, not spread throughout the growing area.

This mechanism was invented to be used for trimming, shaping or pruning shrubs or trees in the field by passing down each row and shaping them to a predetermined conical form. The mechanism will be mounted to a mobile self-propelled vehicle of suitable configuration so the mechanism can be suspended to the right or left side from a rotating shaft. As the vehicle operator approaches a row of trees he opens the hydraulic flow to the hydraulic motors 11 powering the shaping bars. With the shaping mechanism positioned so that each cutting bar passes on the left and right side of the tree, the operator stops the vehicle and with the reciprocating blades 20 moving, he rotates the shaping mechanism one half a revolution either clockwise or counter-clockwise around the tree. This will produce a conical shaped tree, combed by the fingers 29, and 30 on each shaping bar with the trimmings falling to the ground around the tree.

The operator then drives forward and aligns the shaping mechanism over the next tree and shapes it by reversing the previous rotation of the mechanism.

The hydraulic motors 11 are continuously operating, thereby when indexing between trees the shaping mechanism reciprocating motion cleans itself of residue. Since the twin reciprocating shaper bars are powered continuously, as the vehicle indexes from tree to tree, the bars trim growth on each side of the tree as they approach it. When rotated 180 degrees they shape the front and back. After each half rotation, the pull forward to the next tree aligns the shaper mechanism and reverses previous rotation.

As is known, trees and shrubs grow plumb or vertical in hilly areas. With the universal joint mount so described, the shaping mechanism will automatically adapt to hang plumb when shaping trees on an incline. This feature always positions the center line of the acute isosceles triangle formed bars parallel with the center line of the tree independent of the ground terrain the vehicle is sitting on.

The two reciprocating cylinders 4 contain fluid which flows back and forth through lines 4a and valve 4b. This arrangement functions as an adjustable shock absorber and reduces the pendulum effect of the frame universal joint 5.

The parts can be made of any suitable material and in different shapes or sizes as desired or required.

As shown in FIG. 6 wherein there is illustrated a longitudinal enlarged cross sectional view showing the three basic reciprocating movements of the cutting knife, 6-1, 6-2, and 6-3, it will be seen that the three basic reciprocating movements of cutting knife 20 in respect to the stationary insert 22, backing bar 24, and the finger bar 25 and the supporting and guiding action of fingers when the moving cutting knife reciprocates as illustrated.

FIG. 5 is a cross sectional view of one of the twin shaping bars showing the longitudinal bend and orientation of the different parts. The connection for motors 11 and eccentrics 12 is the motor shaft which is part of the motor.

With further reference to FIG. 3, if the frame sways at the bottom to the left, pivoting at pin 6, the rod in cylinder 4 retracts push fluid contained in the cylinder 4 out the top, through line 4a, through flow restrictive valve 4b, which meters the flow into the bottom of cylinder 4 through line 4a. The metering flow slows the swagging down and reduces the pendulum effect of the frame, since the frame will come to rest with the center line plumb or vertical. Because the frame is universal joint mounted, it will sway in any compound angle, therefore two cylinders are used. They are 90 degrees apart to compensate for this infinite directional swaying. The flow restrictive valve is manually set at the desired metering effect. This setting will change as different lengths and weight of cutting bars are assembled to the frame. The valve can also be manually closed to make the universal joint rigid but this would only be needed when the tree is on perfectly flat ground or when transporting the vehicle such as the vehicle 40 to a different location. Generally the valve is left partially opened to allow compensation when shaping trees.

While several embodiments of the present invention have been illustrated and described herein in particular detail, it will be understood that variations and modifications may be effected without departing from the spirit and scope of the novel concepts of this invention.

What is claimed and desired to be secured by U.S. Letters Patent is:

1. A twin mounted double sided reciprocating cutting and shaping mechanism comprising:
   support frame means suspended vertically from a power driven rotating shaft and including universal joint means mounted and having reciprocating cylinders mounted to the frame means,
   a bracket attached to a top yoke of the universal joint,
   a twin pair of longitudinally formed double sided reciprocating cutting blade assemblies consisting of rows of double edged blades reciprocating between stationary formed fingers,
   a twin pair of fluid drive motors, each for power driving one cutting blade assembly by rotating an eccentric hub,
   an arm connected to said eccentric hub and cutting blade assembly for transforming rotary motion into reciprocating motion, and
   longitudinal frame means attached to a bottom of the support frame, suspended downwardly parallel to the double sided reciprocating cutting blade assemblies and attached to the outside of said blade assemblies wherein the material cut off by said cutting assemblies falls on the ground on the outside base of the tree or shrub and is deposited in a circle around said base.

2. A shaping mechanism according to claim 1, wherein said universal joint means is cushioned and controlled by regulating fluid flow through a restriction valve means in hydraulic circuit relation with a reciprocating cylinder whereby said support frame means is symmetrically balanced and is compensated for uneven ground conditions.

3. A shaping mechanism according to claim 1 wherein said cutting assemblies are used providing for one half a revolution to produce a completely shaped tree.

4. A shaping mechanism according to claim 3, wherein the twin pair of longitudinally formed double sided reciprocating cutting blade assemblies are mounted to form an acute isosceles triangle, whereas the sides of said triangle are the cutting and shaping path when rotated about its apex and the bottom of said triangle is open and unobstructed.

5. A shaping mechanism according to claim 4, wherein each said cutting assembly is formed and bent along its longitudinal axis, the cutting blades being oriented slightly inwardly towards the center of said isosceles triangle.

6. A shaping mechanism according to claim 4, wherein each longitudinal edge of said assembly has double sided cutting ability, and when rotated about its apex, cutting is performed selectively in clockwise or counter-clockwise rotation.

7. A shaping mechanism according to claim 4, wherein one cutting blade means of said assemblies is mounted higher at the top than the other and when rotated about a tree or shrub, the lower mounted cutting blade means push the top of said tree or shrub into the cutting path of said higher cutting blade means.

8. A shaping mechanism according to claim 4, wherein each longitudinal side of said assembly has rows of double edged cutting knives cutting and shaping in reciprocating motion.

9. A shaping mechanism according to claim 4, wherein fingers are disposed equally in a relation perpendicular to the longitudinal center line of the cutting assemblies, extending beyond the outward tips of the reciprocating blade, whereby forming a comblike pattern which guides the material into the said blades and guards the tips of the blades.

10. A shaping mechanism according to claim 9, wherein said fingers support and guide the material being cut, not allowing it to fold over said cutting blade.

11. A shaping mechanism according to claim 1, wherein the fluid motors are connected in series, thereby the fluid from the first motor is used to power the second motor and if either motor is stalled by exceeding its power capability, the other motor will stop due to absence of fluid flow.

12. A shaping mechanism according to claim 1, wherein the longitudinal frame supporting the cutting blade assembly can be detached at its flanges and drive arm connection, whereby multiple length sets of cutting blade assemblies can be used with the identical drive assembly.

13. A shaping mechanism according to claim 1, wherein the reciprocating cylinders are mounted by universal joints on each end and automatically adjust to misalignment due to uneven ground conditions and the infinite adjustment capability of the mechanism universal joint mounting.

* * * * *